US009991493B2

(12) United States Patent
Janakiraman et al.

(10) Patent No.: US 9,991,493 B2
(45) Date of Patent: Jun. 5, 2018

(54) HIGH ENERGY DENSITY NON-AQUEOUS ELECTROCHEMICAL CELL WITH EXTENDED OPERATING TEMPERATURE WINDOW

(71) Applicant: EAGLEPICHER TECHNOLOGIES, LLC, Joplin, MO (US)

(72) Inventors: Umamaheswari Janakiraman, Webb City, MO (US); Ernest Ndzebet, Carl Junction, MO (US); Mario Destephen, Joplin, MO (US); Greg Miller, Diamond, MO (US); Joe Edington, Joplin, MO (US); Ramanathan Thillaiyan, Joplin, MO (US)

(73) Assignee: EAGLEPICHER TECHNOLOGIES, LLC, Joplin, MO (US)

( * ) Notice: Subject to any disclaimer, the term of this patent is extended or adjusted under 35 U.S.C. 154(b) by 141 days.

(21) Appl. No.: 14/054,454

(22) Filed: Oct. 15, 2013

(65) Prior Publication Data

US 2016/0359158 A1   Dec. 8, 2016

(51) Int. Cl.
| | | |
|---|---|---|
| *H01M 4/133* | (2010.01) | |
| *H01M 4/38* | (2006.01) | |
| *H01M 4/583* | (2010.01) | |
| *H01M 4/134* | (2010.01) | |
| *H01M 10/0525* | (2010.01) | |
| *H01M 2/16* | (2006.01) | |
| *H01M 10/0567* | (2010.01) | |
| *H01M 10/42* | (2006.01) | |
| *H01M 10/058* | (2010.01) | |
| *H01M 4/02* | (2006.01) | |

(52) U.S. Cl.
CPC ......... *H01M 2/1686* (2013.01); *H01M 2/166* (2013.01); *H01M 2/1653* (2013.01); *H01M 4/133* (2013.01); *H01M 4/134* (2013.01); *H01M 4/382* (2013.01); *H01M 4/5835* (2013.01); *H01M 10/058* (2013.01); *H01M 10/0525* (2013.01); *H01M 10/0567* (2013.01); *H01M 10/4235* (2013.01); *H01M 2004/027* (2013.01); *H01M 2004/028* (2013.01)

(58) Field of Classification Search
CPC ... H01M 4/133; H01M 4/5835; H01M 2/1686
See application file for complete search history.

(56) References Cited

U.S. PATENT DOCUMENTS

| 3,336,145 | A | 8/1967 | Purcell |
| 4,874,682 | A | 10/1989 | Scott et al. |
| 5,114,811 | A | 5/1992 | Ebel et al. |
| 5,407,500 | A | 4/1995 | Forsberg et al. |
| 6,030,720 | A | 2/2000 | Chu et al. |
| 6,060,184 | A | 5/2000 | Gan et al. |
| 8,252,461 | B2 | 8/2012 | Vu et al. |
| 2002/0045101 | A1 | 4/2002 | Hwang et al. |
| 2002/0192557 | A1 | 12/2002 | Choi et al. |
| 2003/0054236 | A1* | 3/2003 | Zucker ............... H01M 2/1606 429/145 |
| 2003/0073005 | A1 | 4/2003 | Kim et al. |
| 2003/0113623 | A1* | 6/2003 | Ndzebet ................ H01M 4/06 429/212 |
| 2004/0009393 | A1 | 1/2004 | Kim et al. |
| 2004/0048164 | A1 | 3/2004 | Jung et al. |
| 2004/0053123 | A1* | 3/2004 | Chang ................ H01M 2/1673 429/144 |
| 2005/0042503 | A1 | 2/2005 | Kim et al. |
| 2005/0053842 | A1 | 3/2005 | Ryu et al. |
| 2005/0089758 | A1 | 4/2005 | Kim et al. |
| 2007/0082264 | A1 | 4/2007 | Mikhaylik |
| 2009/0155695 | A1 | 6/2009 | Noh |
| 2009/0226809 | A1 | 9/2009 | Vu et al. |
| 2010/0221616 | A1 | 9/2010 | Chang et al. |
| 2010/0310907 | A1 | 12/2010 | Miller et al. |
| 2010/0327811 | A1 | 12/2010 | Affinito et al. |
| 2011/0287305 | A1 | 11/2011 | Scordilis-Kelley et al. |
| 2012/0021403 | A1 | 1/2012 | Laderoute et al. |
| 2012/0074746 | A1 | 3/2012 | Gou et al. |
| 2013/0059193 | A1 | 3/2013 | Scordilis-Kelley et al. |
| 2013/0065137 | A1 | 3/2013 | Ndzebet et al. |
| 2013/0099170 | A1 | 4/2013 | Zaldivar et al. |
| 2013/0141050 | A1 | 6/2013 | Visco et al. |

(Continued)

FOREIGN PATENT DOCUMENTS

EP   1 714 339 B1   1/2012
EP   2 421 081 A1   2/2012

(Continued)

OTHER PUBLICATIONS

Guenet et al., "Bulk Crystallization of Isotactic Polystyrene near Its Melting Point: A Neutron Scattering Study of the Chain Trajectory", Macromolecules 1983, 16, 205-210.*
Su et al., "A new approach to improve cycle performance of rechargeable lithium-sulfur batteries by inserting a free-standing MWCNT interlayer," Chem. Commun., 2012, 48, 8817-8819.
Zu et al., "Improved lithium-sulfur cells with a treated carbon paper interlayer,"Phys. Chem. Chem. Phys., 2013, 15, 2291-2297.
Xiong et al., "Properties of surface film on lithium anode with LiNO3 as lithium salt in electrolyte solution for lithium-sulfur batteries," Electrochimica Acta 83,78-86, 2012.
Zhang, "Role of LiNO3 in rechargeable lithium/sulfur battery," Electrochimica Acta 70, 344-348, 2012.

(Continued)

*Primary Examiner* — Ladan Mohaddes
(74) *Attorney, Agent, or Firm* — LSIP Law LLC; Linda Saltiel

(57) ABSTRACT

A non-aqueous electrochemical cell including a lithium anode, a solid cathode, a first separator and a second separator disposed between the anode and the cathode, and an electrolyte in fluid communication with the anode, the cathode, and the first and the second separators, the first separator having a higher melting point (or shut-down) temperature than the melting point (or shut-down) temperature of the second separator.

17 Claims, 3 Drawing Sheets

(56) References Cited

U.S. PATENT DOCUMENTS

| | | |
|---|---|---|
| 2013/0143096 A1 | 6/2013 | Affinito et al. |
| 2013/0196208 A1 | 8/2013 | Nemoto |
| 2013/0224554 A1* | 8/2013 | Hong ................ H01M 2/1686 |
| | | 429/144 |

FOREIGN PATENT DOCUMENTS

| WO | WO 2010/102239 A1 | 9/2010 |
|---|---|---|
| WO | WO 2011/147927 A1 | 1/2011 |

OTHER PUBLICATIONS

Fernandes et al., "Functionalization of Carbon Nanofibers by a Diels-Alder Addition Reaction," J. Nanosci. Nanotechnol. vol. 7, No. 10, 2007.

\* cited by examiner

HIGH ENERGY DENSITY NON-AQUEOUS ELECTROCHEMICAL CELL WITH EXTENDED OPERATING TEMPERATURE WINDOW

TECHNICAL FIELD

The present disclosure generally relates to battery technology. More particularly, the disclosure relates to non-aqueous batteries and/or electrochemical cells including distinct separators, and to methods of forming and using the batteries.

BACKGROUND

The use of batteries is widespread in a variety of different industries, such as the oil and gas drilling and oil and gas well monitoring industries. Batteries used in these industries are particularly important given the remote environment, and they must be able to withstand an enormous variety of operating temperatures, ranging anywhere from about 0° C. to over 500° C.

The batteries also must last long enough to be of practical use in these industries. The remote settings and difficulties presented when operating down hole in an oil well require a high density battery with thermal stability. The challenges of the industries also require a battery that is safe to operate in these extreme conditions. However, current battery technology does not offer a battery with high density, thermal stability, and an extended operating temperature window.

Many current batteries do not operate effectively over an extended temperature window. Some batteries, such as the lithium/copper oxyphosphate battery, operate effectively at high temperatures but may be less effective at lower temperatures (for example, about 25° C. and below). Other batteries, such as alkaline batteries, operate effectively at lower temperatures but may be less effective at elevated temperatures (for example, about 180° C. and above).

Current batteries designed to be used in the oil and gas drilling and oil and gas well monitoring industries that have an extended operating temperature window use a liquid electrolyte as the cathode active material. These cells are very corrosive, and their use can result in extreme safety issues.

Therefore, a non-aqueous electrochemical cell that can operate over an extended temperature window with high energy density, good thermal stability, and improved safety is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure provides an improved non-aqueous battery, an electrolyte and two or more distinct separators for a non-aqueous battery, and methods of forming the non-aqueous battery. In general, the batteries of the present disclosure exhibit increased energy density and specific energy compared to traditional non-aqueous batteries. In addition, the batteries have an extended operating temperature window and are relatively safe, compared to other battery technologies.

In some embodiments, the present disclosure relates to a non-aqueous electrochemical cell including an anode including an anode material comprising lithium; a cathode including a cathode material; a first separator disposed between the anode and the cathode; a second separator disposed between the anode and the cathode; and a non-aqueous electrolyte that is in fluid communication with the anode, the cathode, the first separator, and the second separator, wherein the first separator has a melting point that is higher than a melting point of the second separator.

In some embodiments, the present disclosure relates to methods of manufacturing a non-aqueous electrochemical cell, including providing an anode including an anode material comprising lithium; providing a cathode comprising a fluorinated carbon; disposing a first separator having a melting point of from about 215° C. to about 500° C. between the anode and the cathode; and disposing a second separator having a melting point of from about 135° C. to about 210° C. between the anode and the cathode.

In some embodiments, the present disclosure relates to methods of manufacturing a non-aqueous electrochemical cell, including providing an anode that may be a lithium or lithium alloy material; providing a cathode that may be a solid cathode material; disposing a first separator between the anode and the cathode; disposing a second separator between the anode and the cathode; and placing a non-aqueous electrolyte having an electrolyte additive that may be in direct contact with the anode, the cathode, the first separator, and the second separator.

In some embodiments, the present disclosure relates to methods of manufacturing a non-aqueous battery, including assembling a non-aqueous electrochemical cell by providing a first separator and a second separator between an anode and a cathode thereof, the first separator having a melting point that is higher than a melting point of the second separator; packaging the assembled cell into a battery case; preparing a non-aqueous electrolyte; and adding the non-aqueous electrolyte to the battery case.

BRIEF DESCRIPTION OF THE DRAWINGS

The manner in which the objectives of the present disclosure and other desirable characteristics may be obtained is explained in the following description and attached drawings in which.

DETAILED DESCRIPTION OF THE EMBODIMENTS

Figure 1:
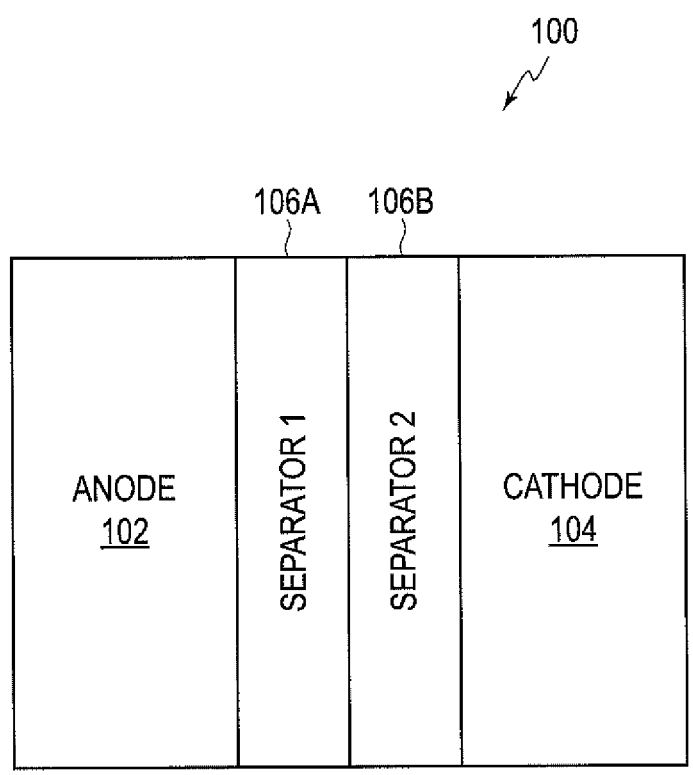
FIG. 1 illustrates a non-aqueous electrochemical cell (or battery) in accordance with various embodiments of the present disclosure.

In the following description, numerous details are set forth to provide an understanding of the present disclosure. However, it may be understood by those skilled in the art that the methods of the present disclosure may be practiced without these details and that numerous variations or modifications from the described embodiments may be possible.

When introducing elements of the present disclosure or the embodiments thereof, the articles "a", "an", "the" and "said" are intended to mean that there are one or more of the elements. The terms "comprising", "including" and "having" are intended to be inclusive and mean that there may be additional elements other than the listed elements.

At the outset, it should be noted that in the development of any such actual embodiment, numerous implementation—specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also include some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

In the present disclosure, a non-aqueous electrochemical cell may otherwise be referred to herein as a battery, a capacitor, a cell, an electrochemical device, or the like. It should be understood that any cell that involves electron transfer between an electrode and an electrolyte is contemplated to be within the scope of the term "electrochemical cell" as used in the present disclosure. The electrochemical cells of the present disclosure may be made in a variety of sizes and configurations in any desirable manner known to those skilled in the art.

As used herein, the terms "anode" and "cathode" are used to describe the respective electrodes in a discharge or use operation of the electrochemical cell. Batteries in accordance with various embodiments of the present disclosure may also include current collectors, terminals, and casings, which are not illustrated. Batteries may be of any size or shape and may include one or more electrochemical cells according to the present disclosure.

In embodiments, the present disclosure relates to a non-aqueous battery or non-aqueous electrochemical cell including an anode comprising lithium, a cathode comprising a fluorinated carbon material, a non-aqueous electrolyte, and two or more separators, where at least two of the separators possess a "shut-down property." The term "shut-down property" refers to the function of closing micropores of the separator when the separator achieves a predetermined high temperature. The lowest temperature of the temperatures at which the micropores of the separator are closed (such that at least 90%, or at least 95%, or at least 99% of the ion conductivity of the separator is terminated) is referred to herein as a "melting point" or "shut-down" temperature of the separator.

In other embodiments, the battery or the electrochemical cell includes two separators both of which possess a shut-down property. In yet other embodiments, the electrochemical cell may include more than two separators, such as 3, 4, or 5 separators, which optionally may comprise one or more additives, where at least two of the separators possess a shut-down property. For example, in such embodiments, the first separator may have a melting point (or shut-down) temperature ranging from about 175° C. to about 650° C., or from about 215° C. to about 500° C., or from about 250° C. to about 400° C.; and the second separator may have a melting point (or shut-down) temperature ranging from about 100° C. to about 250° C., or from about 135° to about 210° C., or from about 150° C. to about 170° C. In some embodiments, one or more of the separators may not possess a shut-down property.

In embodiments, the present disclosure also relates to methods of forming a non-aqueous electrochemical cell or battery by inserting at least two separators, such as at least two separators possessing a shut-down function in which the a melting point or shut-down temperature of the first separator is higher than a melting point or shut-down temperature of the second separator, between the anode and the cathode. In other embodiments, an additive may be added to the electrolyte.

In some embodiments, the methods of the present disclosure include forming a battery by forming a cathode comprising a solid cathode material, such as fluorinated carbon, by providing a substrate; preparing a mixture including a solvent, a binder, a cathode active material (such as fluorinated carbon) to form a slurry; coating the slurry onto the substrate; allowing the solvent to evaporate; forming at least two separators such that the melting point of a first separator is higher than the melting point of the second separator; and inserting the at least two separators between the anode and the cathode.

Additionally, a non-aqueous battery or electrochemical cell according to embodiments of the present disclosure is generally suitable for a number of known applications or devices. Likewise, the batteries (and components thereof) of the present disclosure can be used in a variety of applications in which primary or secondary batteries are used, such as, for example, automotive, transportation, personal safety, security, remote monitoring, law enforcement, utilities, metering, drilling, military and aerospace applications.

In embodiments, the non-aqueous batteries and electrochemical cells may exhibit improved properties in part because the at least two separators interposed between the anode and the cathode include a first separator having a higher melting point than the melting point of the second separator. Therefore, the non-aqueous batteries and electrochemical cells according to the disclosure have improved safety and/or an expanded temperature limit for battery applications.

Methods of the present disclosure may include improving or enhancing one or more of the above-mentioned performance properties of a non-aqueous lithium electrochemical cell by using an anode comprising lithium, a cathode comprising a carbonaceous active material, two or more distinct separators (e.g., the separators having different melting points and/or chemical configurations) interposed between the anode and the cathode, and an electrolyte. In embodiments, the electrolyte is an organic electrolytic solution comprising an additive, such as a wetting agent.

As used herein, "non-aqueous" refers to an electrochemical cell (or battery) that includes or utilizes solvents and salts as the electrolyte. In embodiments, there is no added water to the electrochemical cell (or batteries) of the present disclosure. That is, water may not be added to the electrolyte as a separate or distinct component thereof. In some embodiments, water may be present as a trace or underlying component or contaminant of the solvent(s) used to prepare the electrolyte.

FIG. 1 illustrates a cross-section of a battery 100 in accordance with various embodiments of the present disclosure. Battery 100 includes an anode 102, a cathode 104, an ion conductor (not illustrated), an electrolyte (not illustrated) and two or more separators, such as separators 106A and 106B. In some embodiments, two separators may be used in the batteries and/or cells of the present disclosure.

Figure 2:
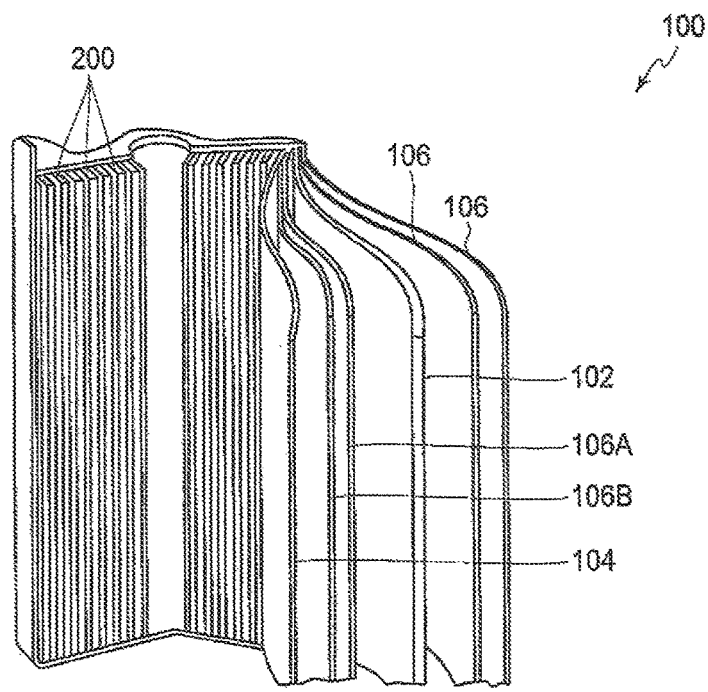
FIG. 2 illustrates a broken perspective view of a non-aqueous electrochemical battery having a plurality of cells according to embodiments of the present disclosure.

FIG. 2 illustrates a more specific embodiment of a battery 100 in accordance with embodiments of the present disclosure. The battery 100 may comprise a plurality of cells 200. The battery 100 or each cell 200 includes an anode 102, a cathode 104, an ion conductor (not illustrated), an electrolyte (not illustrated), and two separators 106A and 106B. In embodiments, the anode 102 and the cathode 104 are spirally wound in such a way that the anode 102 and the cathode 104 overlap each other via the separator for the battery, such as via the two separators 106A and 106B.

In embodiments, the anode 102 may include any anode material suitable for use in non-aqueous electrochemical cells. The anode 102 may comprise a metal selected from Group IA or Group IIA of the Periodic Table of Elements, including, for example, lithium magnesium, sodium, potassium, etc., and their alloys and intermetallic compounds. In embodiments, the anode may include lithium, lithium alloy, and/or a lithium-based anode active material, for example, in the form of a foil, such as a lithium metal foil or a lithium alloy foil. The anode 102 may optionally include a protective separator attached thereto that allows lithium ions to migrate from the anode to an ion conductor and back to the anode 102, respectively, during discharging and charging of the battery. Lithium alloys with melting points over 180° C. may be used to extend the cell operating temperature, such as, for example, a lithium magnesium alloy (with 25% magnesium).

In embodiments, the cathode 104 includes a solid cathode material. The cathode material may include carbonaceous active material. In embodiments, the carbonaceous material may be prepared form carbon and fluorine (i.e., the cathode active material may be a fluorinated carbon material). The fluorinated carbon material may generally be represented by the formula $(CF_x)_n$, wherein x typically varies between about 0.1 to about 1.9, such as between about 0.3 and about 1.2, or between about 0.6 and about 1.0. The fluorinated carbon may also be a mixture of $(CF_{x1})_n$ and $(CF_{x2})_n$, wherein x1 may be about 0.8 to 1.2, and x2 may be about 0.4 to about 0.8. In the above formulas, the "n" refers to the number of monomer units, which may be, e.g., in the range of from 1 to 5, or in the range of from 2 to 4.

In embodiments, the carbonaceous active material, such as fluorinated carbon, that may be present in the cathode material may be optimized for a given application or use, by means generally known in the art. In one embodiment, the cathode mixture may comprise from between about 60% to about 95% by weight of the fluorinated carbon, and some embodiments may comprise from between about 65% to about 90%, or about 70% to about 85% by weight. In embodiments, the cathode materials may consist essentially of fluorinated carbon and, optionally, a binder material and/or a conductive additive, such as carbon black and graphite. In some embodiments, the cathode 104 may include a polymeric material and/or a carbonaceous material.

In embodiments, the cathode may include a binder and electrically conductive additives, such as carbon. Binders suitable for use with the cathode include a polymeric binder, such as polytetrafluoroethylene (PTFE).

In embodiments, the cathode may be prepared with the above-mentioned cathode materials in an average loading amount of from about 0.1 to about 80 mg/cm$^2$, or from about 0.5 to about 50 mg/cm$^2$, or from about 1 to about 40 mg/cm$^2$, or from about 2 to about 30 mg/cm$^2$ on a surface of a substrate on to which the cathode material is loaded.

A non-aqueous battery or electrochemical cell according to the present disclosure may include at least two distinct separators. In embodiments, the first separator 106A may have a higher melting point than that of the second separator 106B. The separators 106A and 106B may be selected to separate the cathode (cathode material) from the anode (anode material) to prevent internal short circuit conditions. The separators 106A and 106B may be selected from materials known in the art to be electrically insulating (and sometimes ionically conductive), chemically non-reactive with the anode and cathode active material, and both chemically non-reactive with and insoluble in the electrolyte. In addition, the material of the separators may be selected such that it may have a degree of porosity sufficient to allow flow through of the electrolyte during the electrochemical reaction of the cell. Finally, the separator material (for separators with or without the shut-down property) may be selected to have any desired thickness ranging from, for example, about 3 μm to about 100 μm, such as from about 5 μm to about 80 μm, or from about 20 μm to about 70 μm, or from about 25 μm to about 50 μm.

The separators (with or without the shut-down property) may be formed to have a porosity in the range of from about 5 to about 85%, such as from about 25 to about 65%, or from about 30 to about 55%, and an air permeability of about 10 to about 10,000 seconds/100 ml, such as about 10 to about 5,000 seconds/100 ml, or about 20 to about 500 seconds/100 ml. Additionally, the separator material (for separators with or without the shut-down property) according to embodiments may have an average pore diameter of from about 0.001 to about 1.0 μm, such as from about 0.05 to about 0.5 μm, or from about 0.01 to about 0.1 μm. The average diameter of the pores of the separator material can be measured using a polymeter as manufactured by Coulter Inc.

The "porosity" as used herein is calculated by measuring a substantial amount W1 of the separator sheet and computing the mass W0 when the porosity is 0% from the density and thickness of the resin composition. From the value of the substantial amount W1 and that of the mass W0, the porosity can be determined based on the following equation:

$$\text{Porosity } Pb(\%)\{(W0-W1)/W0\} \times 100.$$

Examples of separator material and techniques of forming the separators include those known in the art. For example, the materials of the separators may include nonwoven glass, porous TEFLON, glass fiber material, ceramics and materials commercially available under the trademarks ZITEX (Chemplast Inc.), GELGARD (Celanese Plastic Co. Inc.) and DEXIGLAS (C. Dexter Div. Dexter Corp.). In embodiments, the separator materials may include thermoplastic resins, such as polyethylene resins or polypropylene resins.

Further, suitable separator materials may include, or may be selected from, porous or nonporous polymer membranes, such as for example: polypropylene, polyethylene, polyamide (e.g., nylon), polysulfone, polyvinyl chloride (PVC), and similar materials, and combinations thereof (e.g., a trilayer membrane, such as a trilayer membrane of polypropylene/polyethylene/polypropylene), as well as fabrics woven from fluoropolymeric fibers, including for example polyvinylidine fluoride (PVDF), polyvinylidine fluoride-cohydrofluorpropylene (PVDF-HFP), tetrafluoroethylene-ethylene copolymer (PETFE), chlorotrifluoroethylene-ethylene copolymer, and combinations thereof. Fabrics woven from these fluoropolymeric fibers may be used either alone or laminated in a microporous film (e.g., a fluoropolymeric microporous film).

For separators possessing a shut-down property, a main component (and/or one or more components) of the respective separator material (such as one or more of the thermoplastic materials mentioned above) should be selected such that it melts when the battery is placed in a predetermined high-temperature environment, such as due to the occurrence of abnormality. In embodiments, the melting action of the main component (and/or one or more components) of the respective separator material may close the micropores of the separator having the shut-down property and thereby shut off ion conduction inside the battery (i.e., once one or more of the components of the separator material reach a predetermined temperature where it melts to effectively closes the pores of the separator). In embodiments, such a temperature may be in the range of from about 175° C. to about 650° C., or from about 215° C. to about 500° C., or from about 250° C. to 400° C. for a first separator; and a temperature in the range of from about 100° C. to about 250° C., or from about 135° to about 210° C., or from about 150° C. to about 170° C. for a second separator. In embodiments, this action makes it possible to prevent the temperature inside the battery from rising any further (i.e., after the shut-down event occurs).

In some embodiments, one or more of the separators 106, such as, for example, separator 106A may be in the form a laminated porous film including at least one porous film layer that contains a thermoplastic resin composition. The laminated porous film may include, for example, two, three, or more than three film layers. For example, the laminated porous film may include two or three porous film layers. The thickness of the laminated porous film forming the separator according to embodiments of the present disclosure may have a thickness of from, for example, about 5 µm to about 80 µm, or about 7 µm to about 50 µm, or about 10 µm to about 30 µm, or about 11 µm. In various embodiments, the thickness of the laminated porous film is not less than 11 µm and does not exceed 50 µm.

In embodiments of the present disclosure, at least two distinct separators may be interposed between the anode and the cathode of the cell (or battery) in a manner preventing physical contact between the anode and the cathode. Where distinct separators are interposed between the anode and the cathode, the separators may differ with respect to their melting point (or shut-down) temperatures. In embodiments, the first separator may have a higher melting point (or shut-down) temperature than the second separator. For example, the first separator may have a melting point (or shut-down) temperature ranging from about 175° C. to about 650° C., or from about 215° C. to about 500° C., or from about 250° C. to about 400° C.; and the second separator may have a melting point (or shut-down) temperature ranging from about 100° C. to about 250° C., or from about 135° to about 210° C., or from about 150° C. to about 170° C. In embodiments, the first separator may have a melting point (or shut-down) temperature that is higher than the melting point (or shut-down) temperature of the second separator by at least 5° C., in other embodiments by at least 80° C., and in other embodiments by at least 200° C. In describing other embodiments according to the present disclosure, a difference between the melting point (or shut-down) temperature of the first separator and the melting point (or shut-down) temperature of the second separator may be in the range of from 10° C. to 150° C., or from 30° C. to 100° C., or from 50° C. to 80° C.

In embodiments where distinct separators are interposed between the anode and the cathode, the separators may also differ with respect to their chemical configuration (e.g., composition, polymer molecular weight, polymer morphology (crystalline versus amorphous)). Additionally, the first separator may comprise polymer with or without additives. In additional embodiments where two distinct separators are used in the cell (or battery) according to the present disclosure, the second separator may comprise one or more polymer layers having a different chemical configuration from the material of the first separator. In further embodiments, the first separator and the second separator can be bound or laminated together between the anode and the cathode of the electrochemical cell (or battery).

The first separator in connection with the present to the present disclosure may have a melting point (or shut-down temperature) ranging from about 175° C. to about 650° C., or from about 215° C. to about 500° C., or from about 250° C. to about 400° C. Suitable materials for the first separator may include, or may be selected from, polymer films with or without inorganic materials.

The second separator related to the present disclosure may have a melting point (or shut-down temperature) ranging from about 100° C. to about 250° C., or from about 135° to about 210° C., or from about 150° C. to about 170° C. It may have one or more layers of polymer, such as one to three layers. Suitable materials for the second separator may include, or may be selected from, polymer films. The second separator may be, for example, a polypropylene. Other polyolefin separators may also be used. Each layer may be composed with one or more components exhibiting a different chemistry (e.g., composition, polymer molecular weight, polymer morphology (crystalline versus amorphous)).

The non-aqueous battery or electrochemical cell of the present disclosure may include a non-aqueous, ionically conductive electrolyte, which serves as a path for migration of ions between the anode and the cathode electrodes during electrochemical reaction of the cell. The electrolyte may be in either liquid or solid state, or both. The electrochemical reaction at the electrodes involves conversions of ions in atomic or molecular forms that migrate from the anode to the cathode. In some embodiments, the components of the non-aqueous electrolytes may be substantially chemically inert to the anode and cathode materials. Furthermore, an electrolyte in liquid state may exhibit physical properties that are beneficial for ionic transport (e.g., low viscosity, low surface tension, and/or good wettability).

The various components of the electrolyte may be selected from among those generally known in the art, which are suitable for use in combination with the anode, cathode, and the additive materials detailed elsewhere herein. In embodiments, the electrolyte may have an inorganic, ionically conductive salt dissolved in a non-aqueous solvent (or solvent system, when a mixture of solvents is used). The electrolyte may include an ionizable alkali metal salt dissolved in an aprotic organic solvent or a mixture of solvents comprising a low viscosity solvent and a high permittivity solvent. The inorganic, ionically conductive salt may serve as the vehicle for migration of the anode ions to react with the cathode active material. In embodiments, the ion-forming alkali metal salt may be similar to the lithium comprising the anode.

In some embodiments, the electrolyte is a non-aqueous solution (e.g., an organic electrolytic solution). In some embodiments, the electrolyte may include one or more non-aqueous solvent and a salt that is at least partially dissolved in the solvent. The solvent may include an organic solvent such as a polycarbonate and/or ether or mixtures thereof. In some embodiments, the solvent may include includes 1 M $LiBF_4$ dissolved in gamma-butyrolactone (GBL). As discussed above, salts suitable for use with various embodiments of the present disclosure include one or more lithium salts, such as, for example, one or more lithium salts selected from $LiPF_6$, $LiSbF_6$, $LiBF_4$, LiTFSI, LiFSI, $LiAlCl_4$, $LiAsF_6$, $LiClO_4$, $LiGaCl_4$, $LiC(SO_2CF_3)_3$, $LiN(CF_3SO_2)_2$, $Li(CF_3SO_3)$, and $LiB(C_6H_4O_2)_2$.

Low-viscosity solvents (for example, organic solvents) that may be used in the battery or electrochemical cell may include, for example: dioxlane (DOL), dimethyl carbonate (DMC); diethyl carbonate (DEC); 1,2-dimethoxyethane (DME); tetrahydrofuran (THF); methyl acetate (MA); a member of the family of glycol ethers, such as, for example, diglyme (DGL), triglyme, and/or tetraglyme; and high permittivity solvents, including, for example, cyclic carbonates, cyclic esters, and cyclic amides (such as propylene carbonate (PC), ethylene carbonate (EC), acetonitrile, dimethyl sulfoxide (DMS), dimethyl formamide, dimethyl acetamide, gamma-butyrolactone (GBL), and N-methyl-pyrrolidinone (NMP), as well as various mixtures or combinations thereof.

The type and composition of the solvent used in the electrolyte, and/or the type and concentration of a salt present therein, may be selected in order to optimize one or more physical and/or performance properties of the electrochemical cell of the present disclosure. For example, in one or more embodiments, the concentration of the salt in the electrolyte may be in the range of from about 0.5 M to about 2.5 M, from about 0.75 M to about 2.25 M, or from about 1 M to about 2 M. In embodiments where a mixed solvent system is employed, the ratio (by volume) may range, for example, from between about 1:9 and about 9:1 of a first solvent (e.g., a carbonate solvent, such as propylene carbonate) and a second solvent (e.g., a substituted alkane solvent, such as 1,2-dimethoxyethane); that is, the solvent system may comprises from about 10 volume % to about 90 volume %, from about 20 volume % to about 80 volume %, or from about 30 volume % to about 70 volume %, of a first solvent, all or substantially all of the balance of the solvent system being the second solvent.

In embodiments, the non-aqueous electrolyte is an organic electrolytic solution that includes an additive, such as a wetting agent to wet the separator and the cathode. The electrolyte additive may help to improve low temperature performance of the cell. In further embodiments, the electrolytic solution additive in the electrolytic solution may include one or more oxazoline compounds.

The electrolyte employed in the non-aqueous electrochemical cell or battery in embodiments of the present disclosure may provide paths for migration of ions between the anode and the cathode electrodes during electrochemical reactions of the cell. The electrolyte may be in either liquid state or solid state, or both. The various components of the electrolyte may be selected from among those generally known in the art that are suitable for use in combination with the anode, the cathode, the first separator, the second separator, and the electrolyte additive materials detailed elsewhere herein In embodiments, the electrolyte may include an additive, such as an oxazoline compound (a wetting agent). Oxazoline compounds may not be water soluble and have the general formula $C_3H_5NO$. For example, ALKATERGE E (manufactured by Angus™) may be used in embodiments as the electrolyte additive.

The type and concentration of the one or more oxazoline compounds present in the electrolyte of the electrochemical cell or battery in embodiments may be selected in order to optimize one or more physical and/or performance properties of the electrochemical cell (or battery) of the present disclosure. In some embodiments, the concentration of the one or more oxazoline compounds in the electrolyte may be in the range of from about 0.001% to about 20% by weight based on the total weight of the electrolyte, such as from about 0.001% to about 10% by weight based on the total weight of the electrolyte, or from about 0.001% to about 5% by weight based on the total weight of the electrolyte, or from about 0.01% to about 4% by weight based on the total weight of the electrolyte, or from about 1% to about 2% by weight based on the total weight of the electrolyte.

In embodiments, the one or more oxazoline compounds included in the electrolyte may be represented by General Formula I having the following general structure:

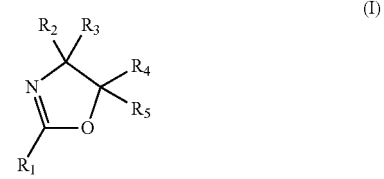

wherein $R_1$ may be an alkyl group, an alkene group, an alkenyl group, aryl group, alkylaryl group, or aromatic group (each of which may or may not be substituted), such as an alkyl group, an alkene group, or an alkenyl group containing from about 1 to about 60 carbon atoms, such as from about 5 to about 36 carbon atoms, or from about 10 to about 24 carbon atoms, or an aryl group, alkylaryl group, or aromatic group containing from about 5 to about 20 carbon atoms, such as from about 6 to about 18 carbon atoms, or from about 7 to about 14 carbon atoms; $R_2$, $R_3$, $R_4$, and $R_5$ may be the same or different and are groups having from about 1 to about 60 carbons, or from about 2 to about 30 carbons, such as an hydroxyalkyl group having from about 1 to about 60 carbons, or from about 2 to about 30 carbons, or an alkyl ester group having from about 1 to about 60 carbons, or from about 2 to about 30 carbons; for example, in some embodiments, one or more of $R_2$, $R_3$, $R_4$, and $R_5$ may be a hydroxylalkyl group of the formula —$(CH_2)_n$—OH, wherein n is an integer of from about 1 to about 60, such as from about 5 to about 36 carbon atoms, or from about 10 to about 24 carbon atoms; or in some embodiments, one or more of $R_2$, $R_3$, $R_4$, and $R_5$ may be an alkyl ester group of the formula —$(CH_2)_n$—$O_2C$—$(CH2)_m CH_3$, wherein n is an integer of from about 1 to about 7, or from about 2 to about 5, and m is an integer of from about 1 to about 60, such as from about 5 to about 36 carbon atoms, or from about 10 to about 24 carbon atoms.

In some embodiments, $R_2$, $R_3$, $R_4$, and $R_5$ may be the same or different and may be selected from hydrogen, halogens, such as F, Cl, Br, I, alkyl group, aryl group, alkylaryl group, or aromatic group (each of which may or may not be substituted), including, for example, a linear or branched alkyl group of from about 1 to about 60 carbons, a linear or branched hydroxylalkyl group of from about 1 to about 60 carbons, a linear or branched alkyl ester group of from about 1 to about 60 carbons, or an aryl ester group, or a cyclic alkyl group of from about 3 to about 60 carbons, a cyclic alkyl alcohol group of from about 3 to about 60 carbons, a cyclic alkyl ester group of from about 3 to about 60 carbons, wherein at least one of $R_2$, $R_3$, $R_4$, and $R_5$ is a hydroxylalkyl group.

The term "saturated" refers, for example, to compounds containing only single bonds, and in this specification, also includes cyclic structures. The term "unsaturated" refers, for example, to compounds that contain one or more double bonds and/or one or more triple bonds, which may include carbon atoms and/or heteroatoms such as O, N, S, and P.

The term "alkyl" refers, for example, to a saturated hydrocarbon group that is acyclic or cyclic, and either branched or unbranched, derived from an alkane and having the general formula $C_nH_{2n+1}$ or $C_nH_{2n-1}$, in which n is an integer having a value of 1 or more. For example, n may be an integer in the range from 1 to about 60, or from about 8 to about 60, such as from about 12 to about 45, or from about 24 to about 40. In some embodiments, n may be an integer of from 1 to about 7, such as from about 2 to about 5, or from about 3 to about 4. Exemplary alkyl groups include methyl, ethyl, n-propyl, isopropyl, n-butyl, isobutyl, sec-butyl, tert-butyl, n-pentyl, neo-pentyl, cyclopentyl, n-hexyl, cyclohexyl, n-octyl, iso-octyl, cyclooctyl, decyl, tetradecyl, hexadecyl, eicosyl, tetracosyl, isomeric forms thereof, and the like. Alkyl groups may be substituted by replacing one or more hydrogen atoms with one or more functional groups.

The term "alkene" refers, for example, to branched and unbranched unsaturated molecules that are derived from alkenes and include one or more double bonds between carbon atoms. The alkene groups in the oxazoline compounds of the present disclosure may contain from 1 to about 60 carbon atoms, or from about 8 to about 60 carbon atoms, such as from about 12 to about 45 carbon atoms, or from about 24 to about 40 carbon atoms. In some embodiments, alkene groups in the oxazoline compounds of the present disclosure may contain from 1 to about 7 carbon atoms, such as from about 2 to about 5 carbon atoms, or from about 3 to about 4 carbon atoms. Exemplary alkenes include ethylene, propene, butene, butadiene, octene, decene, tetradecene, hexadecene, eicosene, tetracosene and the like. Alkene groups may be substituted by replacing one or more hydrogen atoms with one or more functional groups.

The term "alkenyl" refers, for example, to a branched or unbranched unsaturated hydrocarbon group containing one or more double bond and derived from an alkene. The alkenyl groups in the oxazoline compounds of the present disclosure may contain from 1 to about 60 carbon atoms, or from about 8 to about 60 carbon atoms, such as from about 12 to about 45 carbon atoms, or from about 24 to about 40 carbon atoms. In some embodiments, alkenyl groups in the oxazoline compounds of the present disclosure may contain from 1 to about 7 carbon atoms, such as from about 2 to about 5 carbon atoms, or from about 3 to about 4 carbon atoms. Exemplary alkenyl groups include ethylenyl, propenyl, butenyl, octenyl, decenyl, tetradecenyl, hexadecenyl, eicosenyl, tetracosenyl and the like. Alkenyl groups may be substituted by replacing one or more hydrogen atoms with one or more functional groups.

The term "aromatic" refers to aromatic compounds which have a functional group that contains a total of (4n+2) π electrons (where integer n is from 1 to 6) that are arranged in a conjugated and continuously delocalized manner within that group, and which may include heteroatoms such as O, N, S, B, Se, or Fe, and which may include one or more cyclic or ring systems that may include one or more fused aromatic or cycloaliphatic rings. Examples of aromatic compounds include, for example, benzene ($C_6H_6$), naphthalene ($C_{10}H_8$), anthracene ($C_{14}H_{10}$), phenanthrene ($C_{14}H_{10}$), pyridine ($C_5H_5N$), pyrrole ($C_4H_5N$), furan ($C_4H_4O$), thiophene ($C_4H_4S$), and the like. Optionally, these aromatic compounds may be substituted with one or more independently selected substituents, including alkyl and cycloalkyl, alkenyl, alkoxy, aryl, hydroxyl, thiol, halo (such as F, Cl, Br, I), (thio)ester, carboxylic acid, acyl, (alkyl)amino, (aryl)amino, and nitro groups.

The term "aryl" refers, for example, to an organic group derived from an aromatic compound and having the same general structure as the aromatic compound. Examples of aromatic compounds include, for example, phenyl ($C_6H_5$), benzyl ($C_7H_7$), naphthyl ($C_{10}H_7$), anthracenyl ($C_{14}H_9$), furanyl ($C_4H_3O$), pyridinyl ($C_5H_4N$), thiopheneyl (C4H3S), and the like. Optionally, these aromatic groups may be substituted with one or more independently selected substituents, including alkyl and cycloalkyl, alkenyl, alkoxy, aryl, hydroxyl, thiol, halo (such as F, Cl, Br, I), (thio)ester, carboxylic acid, acyl, (alkyl)amino, (aryl)amino, and nitro groups.

The terms "halogen" or "halogen atom" refer, for example, to Group 7 elements, such as fluorine (F), chlorine (Cl), bromine (Br), and iodine (I). The term "halo" refers, for example, to substitution of a halogen atom for a hydrogen atom in an organic compound.

The term "alkylaryl" refers, for example, to groups comprising and alkyl moiety and an aryl moiety, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, with from, for example, about 6 to about 50 carbon atoms in the alkylaryl chain, such as from about 6 to about 40 or from about 7 to about 20 carbon atoms, wherein the substituents on the substituted alkyl, aryl, arylalkyl, and alkylaryl groups may be, for example, halogen atoms, ether groups, aldehyde groups, ketone groups, ester groups, amide groups, imide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

The term "derivative" refers, for example, to compounds that are derived from another compound and maintain the same general structure as the compound from which they are derived.

In some embodiments, the one or more oxazoline compounds may be selected such that the compounds are not water soluble and/or are soluble in the electrolyte. For example, in some embodiments, the one or more oxazoline compounds of the electrolyte may comprise an oxazoline compound having the following structure:

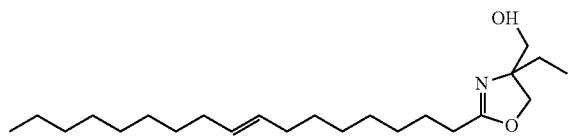 [SMILES: CCCCCCCC/C=C/CCCCCCCC1=NC(CC)(CO)CO1]

(4-ethyl-2-(8-heptadecenyl)-2-oxazoline-4-methanol) in which $R_1$ is an alkenyl group having 17 carbon atoms, $R_2$ is a hydroxylalkyl group of the formula —$(CH_2)_n$—OH in which n is 1, $R_3$ is an alkyl group having two carbon atoms (an ethyl group), and $R_4$ and $R_5$ are each a hydrogen.

Suitable oxazoline compounds that may also be used in the methods, batteries and electrochemical cells of the present disclosure, such as those of General Formula I and methods for preparing such compounds, are described in U.S. Pat. No. 5,407,500, U.S. Pat. No. 5,817,169 and U.S. Pat. No. 5,698,017, the disclosures of each of which are incorporated herein by reference in their entireties.

Briefly, oxazoline compounds, such as those of General Formula I, may be prepared by a condensation reaction occurring at a suitable temperature, such as a high temperature condensation at a temperature above about 120° C., or in the range of from about 120° C. to about 220° C., or in the range of from about 150° C. to about 210° C., of an acid having an $R_1$ group as defined above with at least 1 molar equivalent of a suitable amino alcohol. In embodiments, the condensation reaction between the desired acid and the suitable amino alcohol may be performed at a reduced pressure, such as less than about 100 mmHg, or in the range of from about 0.1 mmHg to about 50 mmHg, at a suitable temperature to ensure complete reaction, such as in the temperature range of from about 120° C. to about 220° C., or from about 130° C. to about 210° C., or from about 150° C. to about 210° C. The condensation reaction may be carried out with or without the use of a catalyst; however catalysts may be used to expedite the completion of the reaction. The various types of catalysts that can be used include, for example, tetraalkyl titanates, dialkyltin oxides such as dibutyltin oxide (dibutyl oxostannane), tetraalkyltin oxide compounds such as dibutyltin dilaurate, dialkylstannoic acid compounds such as butylstannoic acid, aluminum alkoxides, alkyl zinc, dialkyl zinc, zinc oxide, stannous oxide, or mixtures thereof; and which catalysts are selected in amounts of, for example, from about 0.005 mole percent to about 5 mole percent based on the starting diacid. In embodiments, the condensation reaction is complete (i.e., at least 95%, such as 99%, of the diacid has been reacted) in less than about 15 hours, such as less than about 12 hours, or less than about 10 hours.

A form or configuration of the non-aqueous electrochemical cell according to embodiments of the present disclosure may generally be selected from those known in the art. In embodiments, the form or configuration of the electrochemical cell may be a case-negative design, wherein the cathode/anode/separator/electrolyte components are enclosed in a conductive metal casing such that the casing may be connected to the anode current collector in a case-negative configuration, although case-neutral design may also be suitable. A material for the casing may be titanium, although stainless steel, nickel, and aluminum are also suitable. The casing header may comprise a metallic lid having a sufficient number of openings to accommodate the glass-to-metal seal/terminal pin feed through for the cathode electrode. The anode electrode may be connected to the case. An additional opening may be provided for electrolyte filling. The casing header may comprise elements that are compatible with the other components of the electrochemical cell and is resistant to corrosion. The cell may thereafter be filled with the electrolyte solution described herein above and hermetically sealed, such as by welding a stainless steel plug over the fill hole. The cell may alternatively be constructed in a case-positive design.

For example, in some embodiments, such an electrochemical cell may be a non-aqueous battery, comprising: an anode comprising at least one lithium-based anode active material; a cathode including at least one cathode active material; a first separator and a second separator interposed between the anode and the cathode to separate the cathode and the anode from each other; and a non-aqueous electrolyte that is in fluid communication with the anode, the cathode, the first separator, and the second separator. In embodiments, the first separator may have a melting point that is higher than a melting point of the second separator. In additional embodiments, the non-aqueous electrolyte may include a lithium salt and an organic solvent. The non-aqueous electrolyte may also include an additive that comprises at least one Oxazoline compound as discussed above.

In some embodiments, the first separator and/or the second separator having any of the configurations described in the present disclosure may be located between the anode and the cathode as one or two free-standing sheets. The separators may be located at any predetermined distance to the anode and/or the cathode, respectively. For example, the first separator and the second separator may be located between the anode and the cathode at a distance that is closer to the anode than to the cathode, or at a distance that is closer to the cathode than to the anode. Alternatively, the first separator may be located closer to the anode and the second separator may be located closer to the cathode, or vice versa. In other embodiments, the first separator and the second separator may be laminated or bound together or, alternatively, the first separator and/or the second separator may be laminated onto the surface(s) of the anode and/or the cathode.

The batteries of the present disclosure, both with and without reserve design, possess the performance to be useful in many applications. The batteries may be used for military applications, with sufficient power density to replace currently used lithium-alloy/iron disulfide thermal batteries, and sufficient energy to replace currently used lithium/sulfur dioxide primary batteries.

Having described the disclosure in detail above, it will be apparent that modifications and variations are possible without departing from the scope of the disclosure defined in the appended claims. It should be understood that various principles of the disclosure have been described in illustrative embodiments. However, many combinations and modifications of the above described formulations, proportions, elements, materials, and components used in the practice of the claimed invention, in addition to those not specifically described, may be varied and particularly adapted to specific environments and operating requirements without departing from those principles. Other variations and modifications of the present disclosure will be apparent to those of ordinary skill in the art, and it is the intent that such variations and modifications be covered by this disclosure.

Further, the description of various embodiments herein makes reference to the accompanying drawing figures, which show the embodiments by way of illustration and not of limitation. While these embodiments are described in sufficient detail to enable those skilled in the art to practice the claimed invention, it should be understood that other embodiments may be realized and that logical and mechanical changes (e.g., electrolyte compositions, electrochemical cell components and configurations, etc.) may be made without departing from the spirit and scope of the claimed invention. Thus, the disclosure herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Additionally, functional blocks of the block diagrams and flowchart illustrations provided herein support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based electronics and/or computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the claimed invention. The scope of the claimed invention is accordingly to be limited by nothing other than the claims that may be included in an application that claims the benefit of the present application, in which reference to an element in the singular is not intended to mean "one and only one" unless explicitly so stated, but rather "one or more." Moreover, where a phrase similar to "at least one of A, B, and C" may be used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Although certain embodiments may have been described as a method, it is contemplated that the method may be embodied as computer program instructions on a tangible computer-readable carrier and/or medium, such as a magnetic or optical memory or a magnetic or optical disk. All structural, chemical, and functional equivalents to the elements of the above-described embodiments that are known to those of ordinary skill in the art are contemplated within the scope of this disclosure.

The following examples describe a process of manufacturing an electrochemical cell according to various embodiments. These are several illustrations among numerous varieties. Therefore, these examples do not in any way limit the content of the present disclosure.

EXAMPLES

Electrochemical Testing was carried out on test cells with a cathode, which was prepared by laminating a carbon monofluoride ($CF_x$) onto stainless steel mesh that was used as current collector. Carbon and PTFE were used as electronic conducting additive and binder, respectively. The cathode contained 87.6 wt. % $CF_x$, 10 wt. % carbon and 2.4 wt. % polytetrafluoroethylene (PTFE). The cathode loading was 174 mg/cm$^2$. The test cell also included a lithium metal foil anode. The first layer of separator used included a polyimide based polymer, and the second layer of the separator was polypropylene. The thickness of the polyimide separator layer was 24 µm with a porosity of 48%. The second layer consisted of a polypropylene layer of 25 µm with a porosity of 41%. The cathode was a $CF_x$ cathode of 1.26 mm thickness with 40% porosity and the anode was lithium metal with 0.77 mm thickness. The two layers of separators were sandwiched between the cathode and anode, with polyimide facing the former and the polypropylene facing the latter, respectively. The glass transition temperature of polyimide is >400° C. and the shut-down temperature of polypropylene is about 165° C.

When two layers of polyimide or other similar separators were used, the cells failed the nail penetration test. In contrast, when the polyimide was used along with polypropylene or other polymers with low melting point below that of lithium (180° C.), the cells passed the nail penetration test.

The electrolyte included 1M $LiBF_4$ (lithium salt) in γ-butyrolactone (GBL; solvent) with 1% ALKATERGE®-E (4-ethyl-2-(8-heptadecenyl)-2-oxazoline-4-methanol) manufactured by ANGUS™ chemical company. The addition of ALKATERGE®-E to the electrolyte improved the cathode and separator wettability, which extended cell performance at low temperature. The cells were assembled as shown in FIG. 2.

Figure 3:
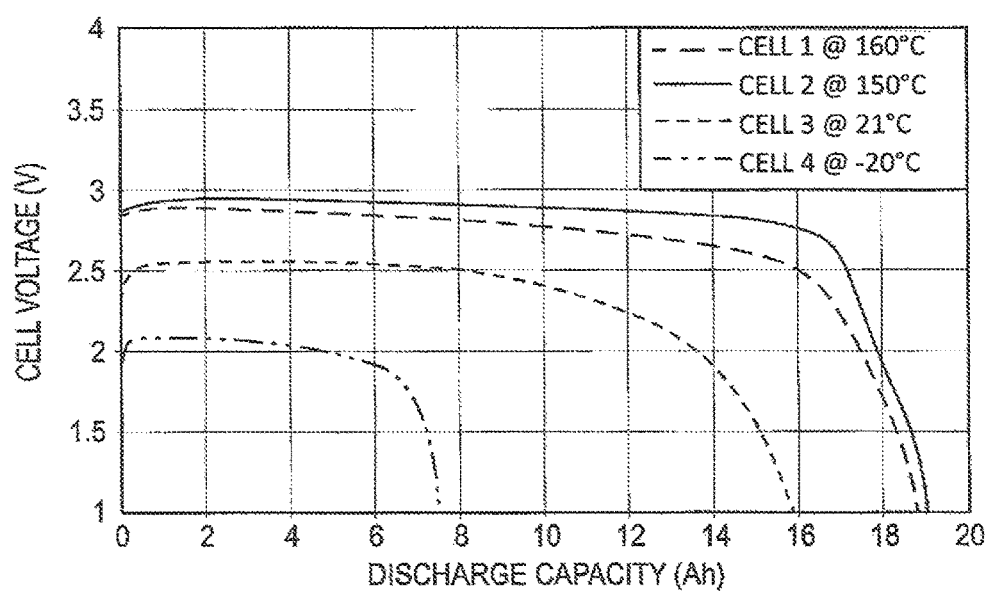
FIG. 3 illustrates the discharge performance of D size cells.

Discharge Performance: The results of the discharge performance tests (cell configuration-D size cell; capacity 18 Ah; the cell was discharged at (C/80) rate or 0.23 A in continuous mode) are set forth in FIG. 3, which illustrates the discharge performance of the test cells at various temperatures (160° C., 150° C., 21° C., and −20° C.).

Abuse Tests Results: The above cells passed all abuse tests including nail penetration. Nail penetration test was performed by forcing a nail with 2.5 mm diameter at a speed of 8 cm/s. However, cells using either 1 or 2 layers of polyimide separator(s) failed this test. The cells passed nail penetration test when a secondary separator with a lower melting point was used in combination with the polyimide separator. The cells of the present invention also passed the other abuse tests carried out according to ANSI C18.3 M, Part 2-2011 for Thermal shock (7.3.2 Test B), Vibration (7.3.3 Test C), Mechanical Shock (7.3.4 Test D), External Short-Circuit (7.4.1 Test F) and Forced Discharge (7.4.2 Test G).

Figure 4:
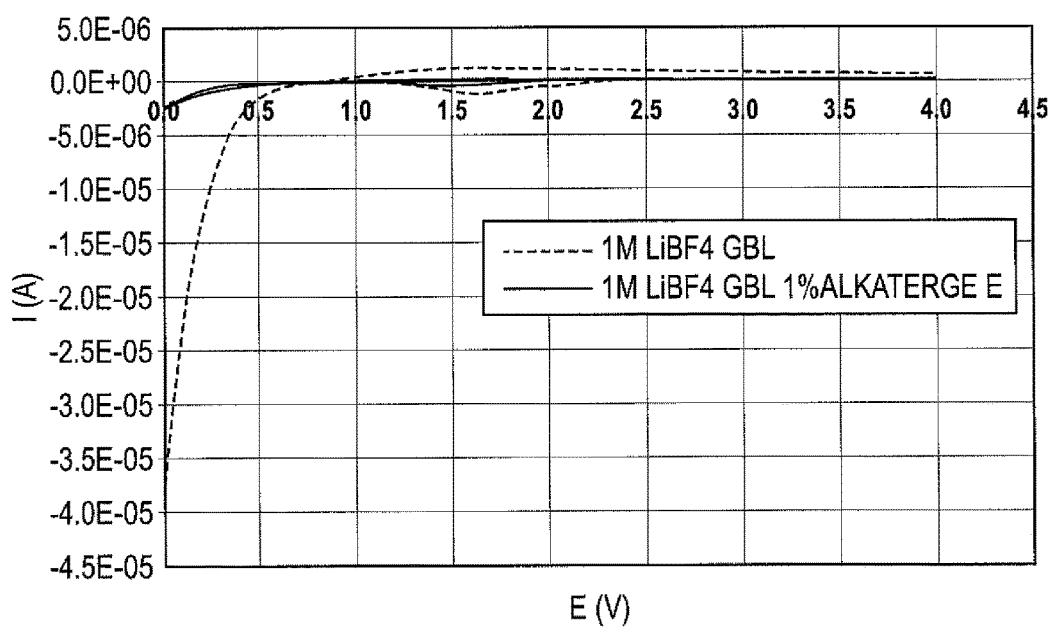
FIG. 4 illustrates the electrochemical stability of an electrolyte according to embodiments of the present disclosure.

The electrolyte electrochemical stability was assessed with and without an Oxazoline compound (4-ethyl-2-(8-heptadecenyl)-2-oxazoline-4-methanol) present. The results of the tests are set forth in FIG. 4, which illustrates the cyclic voltammetry data obtained (at 1 mV/s versus Li/Li+ at room temperature) for the above test cell with and without an oxazoline compound (4-ethyl-2-(8-heptadecenyl)-2-oxazoline-4-methanol) present. As illustrated in FIG. 4, the presence of the oxazoline compound (4-ethyl-2-(8-heptadecenyl)-2-oxazoline-4-methanol) significantly extends the voltage operating window and increases the electrochemical stability of the electrolyte at the lithium anode.

Although the present invention is set forth herein in the context of the appended drawing figures, it should be appreciated that the invention is not limited to the specific form shown. For example, while the disclosure is conveniently described in connection with particular electrolytes comprising oxazoline compounds, polymeric materials, and two or more separators, the present disclosure is not so limited. Furthermore, although the battery is described in connection with specific configurations, the invention is not limited to the illustrated examples. Various modifications, variations, and enhancements in the design and arrangement of the method and apparatus set forth herein, may be made without departing from the spirit and scope of the present disclosure as set forth in the appended claims.

Having described the disclosure in detail above, it will be apparent that modifications and variations are possible without departing from the scope of the disclosure defined in the appended claims.

What is claimed is:

1. A non-aqueous electrochemical cell comprising:
an anode including an anode material comprising lithium;
a cathode including a cathode material comprising carbon monofluoride (CFx), carbon and polytetrafluoroethylene (PTFE);
a first separator disposed between the anode and the cathode;
a second separator disposed between the anode and the cathode; and
a non-aqueous electrolyte that is in fluid communication with the anode, the cathode, the first separator, and the second separator,
wherein the first separator comprises a polyimide based polymer and has a porosity in a range of 25% to 65%, and
wherein the second separator comprises polypropylene and has a porosity in a range of 25% to 65%, and
wherein the porosity of the first separator and the porosity of the second separator allow the non-aqueous electrolyte to flow through during an electrochemical reaction of the cell, and
wherein the first separator and the second separator are laminated together, and
wherein the first separator has a melting point that is higher than a melting point of the second separator, and
wherein a difference between the melting point of the first separator and the melting point of the second separator is at least 235° C.

2. The non-aqueous electrochemical cell of claim 1, further comprising an electrolyte additive disposed in the non-aqueous electrolyte, the electrolyte additive comprising at least one oxazoline compound having the general formula $C_3H_5NO$.

3. The non-aqueous electrochemical cell of claim 2, wherein the electrolyte additive comprises a 4-ethyl-2-(8-heptadecenyl)-2-oxazoline-4-methanol represented by the following general structure:

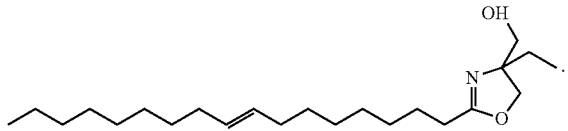 [SMILES: CCCCCCCC/C=C/CCCCCCCC1=NC(CC)(CO)CO1]

4. The non-aqueous electrochemical cell of claim 1, wherein the first separator comprises a polymer filled with an inorganic material.

5. The non-aqueous electrochemical cell of claim 1, wherein the first separator comprises a film with no inorganic material.

6. The non-aqueous electrochemical cell of claim 1, further comprising a wetting agent disposed in the electrolyte, wherein the wetting agent is an oxazoline compound having the general formula $C_3H_5NO$.

7. The non-aqueous electrochemical cell of claim 1, wherein the second separator comprises at least one polymer layer.

8. The non-aqueous electrochemical cell of claim 1, wherein the second separator is a film comprising three polymer layers.

9. The non-aqueous electrochemical cell of claim 1, wherein the first separator and the second separators have an average pore diameter of from about 0.001 μm to about 1.0 μm.

10. The non-aqueous electrochemical cell of claim 1, wherein the non-aqueous electrolyte is an organic electrolytic solution.

11. The non-aqueous electrochemical cell of claim 1, wherein the non-aqueous electrochemical cell is a battery.

12. The non-aqueous electrochemical cell of claim 1, wherein the anode material is a lithium metal foil or lithium alloy.

13. The non-aqueous electrochemical cell of claim 1, wherein the non-aqueous electrochemical cell is not pressurized.

14. A method of manufacturing a non-aqueous battery including an assembled cell the method comprising:
assembling the non-aqueous electrochemical cell by of claim 1;
packaging the assembled cell into a battery case;
preparing the non-aqueous electrolyte; and
adding the non-aqueous electrolyte to the battery case.

15. The method of claim 14, wherein preparing the non-aqueous electrolyte comprises dispersing a wetting agent in the non-aqueous electrolyte, the wetting agent being an oxazoline compound having the general formula $C_3H_5NO$.

16. The non-aqueous electrochemical cell of claim 1, wherein the cathode comprises carbon monofluoride (CFx) laminated onto a stainless steel mesh, and wherein the stainless steel mesh is a current collector of the non-aqueous electrochemical cell.

17. The non-aqueous electrochemical cell of claim 1, wherein the cathode comprises 87.6% carbon monofluoride (CFx) by weight based on a weight of the cathode, 10% carbon by weight based on a weight of the cathode and 2.4% polytetrafluoroethylene (PTFE) by weight based on a weight of the cathode.

* * * * *